United States Patent
Amir et al.

[15] 3,678,754
[45] July 25, 1972

[54] FLOW MEASURING DEVICE

[72] Inventors: Ilan Amir; Anthony Peranio, both of Haifa, Israel

[73] Assignee: Technion Research and Development Foundation Limited

[22] Filed: Dec. 11, 1969

[21] Appl. No.: 884,343

[30] Foreign Application Priority Data

Dec. 16, 1968   Israel ........................................ 31,278

[52] U.S. Cl. ................................................ 73/419, 73/212
[51] Int. Cl. ..................................................... G01l 7/16
[58] Field of Search ..................... 73/419, 212, 182, 4 D

[56] References Cited

UNITED STATES PATENTS

| 1,107,298 | 8/1914 | Haas | 73/419 |
| 3,133,435 | 5/1964 | Lewis, Jr. | 73/419 UX |
| 1,116,938 | 11/1914 | Sheldon | 73/212 |
| 1,204,013 | 11/1916 | Hanni | 73/419 |
| 3,183,722 | 5/1965 | Unger et al. | 73/419 X |

FOREIGN PATENTS OR APPLICATIONS 199,492   6/1923   Great Britain ............................ 73/212

OTHER PUBLICATIONS

Publication: " Simplex Pitot Tube" by the Geo. H. Gibson Company, Oct., 1918 Pages 11 and 12.

*Primary Examiner*—Louis R. Prince
*Assistant Examiner*—Daniel M. Yasich
*Attorney*—Harry C. Bierman, Jordan B. Bierman and Bierman & Bierman

[57] ABSTRACT

A device for measuring the velocity of a fluid flowing in a closed pipe said device comprising a hollow conduit with a pressure port at each end and a spring loaded piston loosely fitted in said conduit, each of said pressure ports connecting to a Pitot tube having two pressure openings one of said pressure openings facing upstream and the other downstream of said fluid flowing in the closed pipe.

7 Claims, 3 Drawing Figures

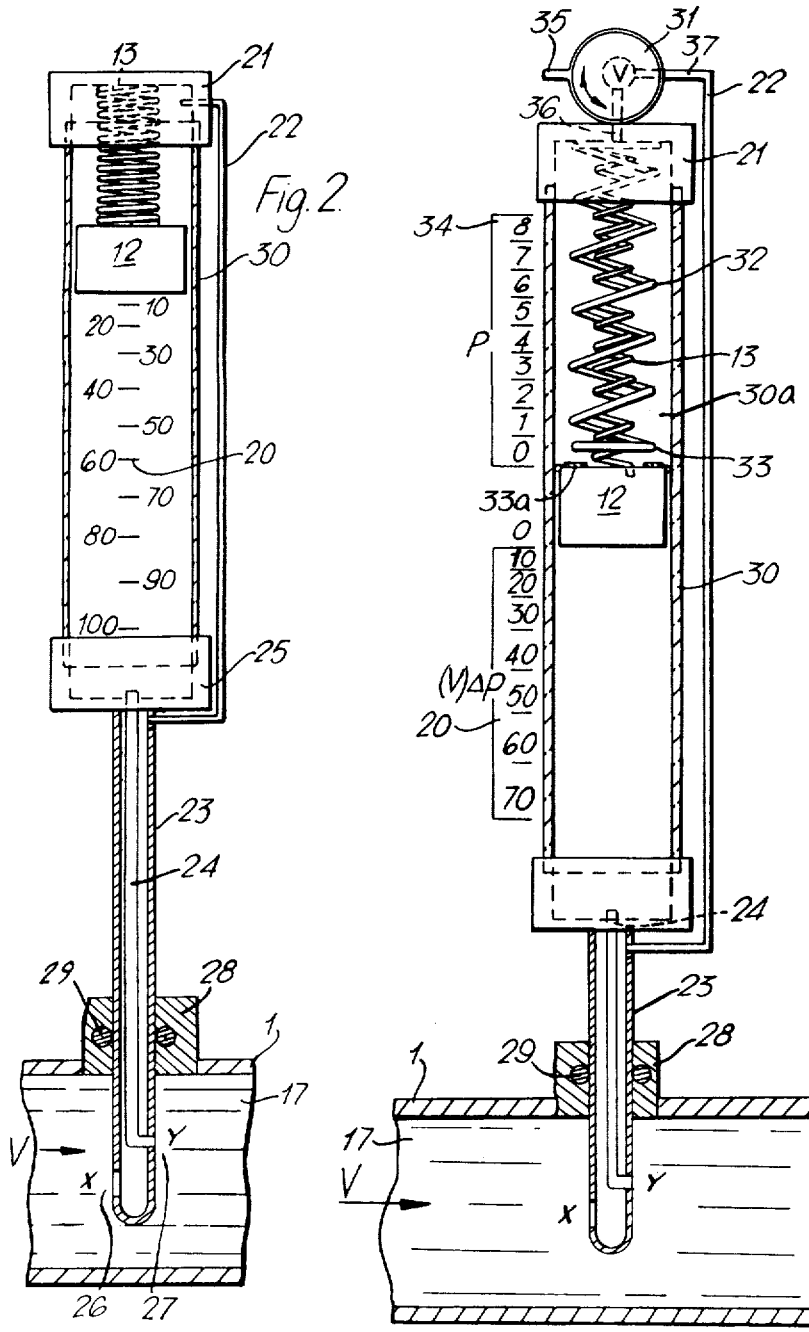

FLOW MEASURING DEVICE

This invention deals with a low-cost, simple, and accurate pressure differential device having a broad range of application in hydraulic measurements. More particularly, this invention relates to a device for measuring velocities and rates of flow of fluids flowing in pipelines and conduits. When used in combination with a small double pitot tube, the device of the present invention is particularly suitable for measurements in the field. By means of a special modification the device of the present invention can be used both for measuring the pressure and velocity of fluids in pipelines. Due to its simplicity and its relatively few number of parts the devices of the present invention are inexpensive to manufacture. In addition, the instruments are highly accurate. Still further, the instrument is compact and is easy to connect to pipelines in which measurements are to be made.

The embodiments of the invention are described by the use of three figures in which:

FIG. 2 is a drawing depicting the use of the invention in conjunction with a Pitot tube in order to measure fluid velocity; and FIG. 3 is a drawing of an embodiment of the invention used for measuring both line pressure and differential pressure produced as a consequence of fluid velocity in a pipe.

Figure 1:
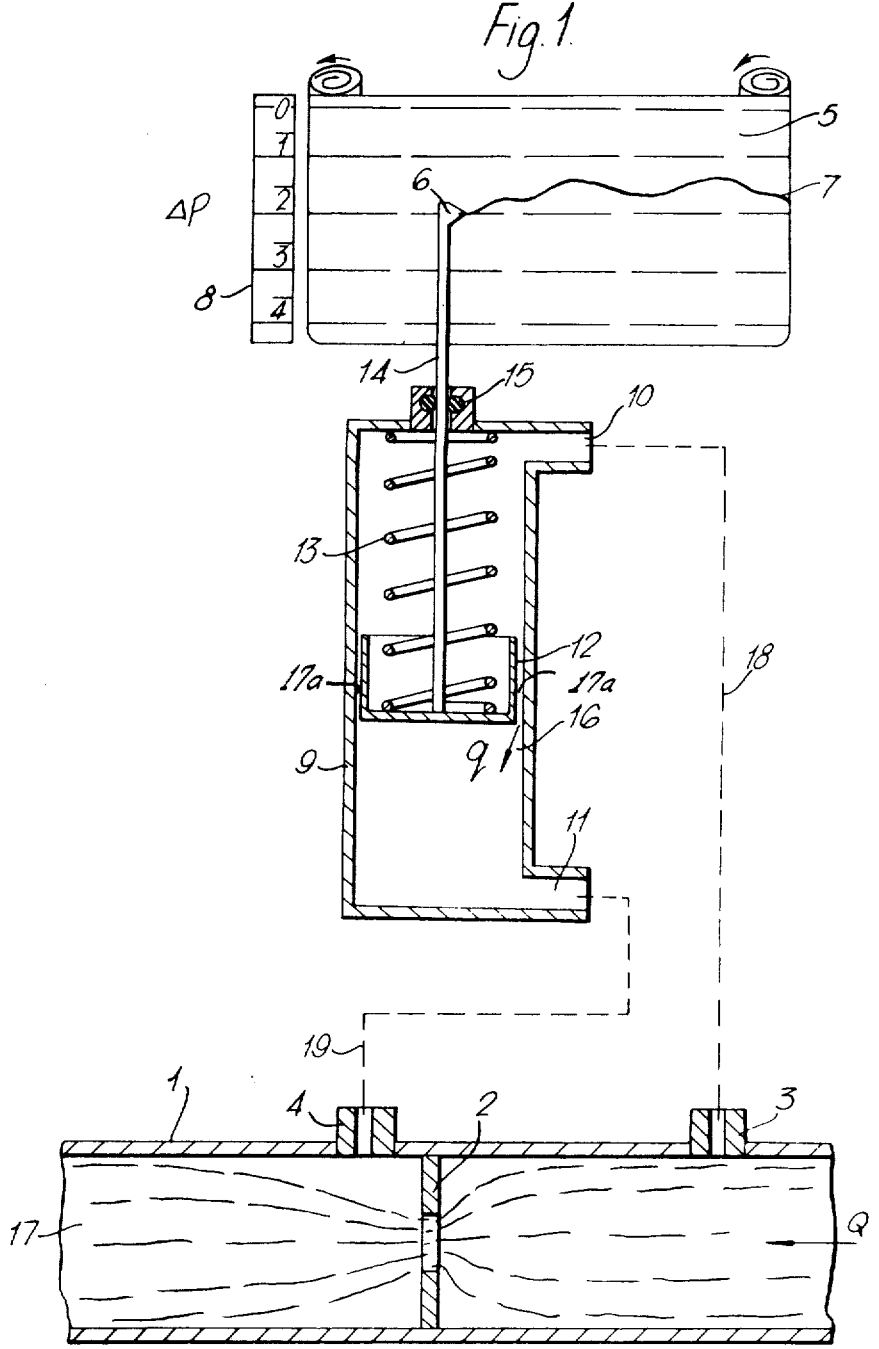
FIG. 1 is a drawing depicting the use of the invention in a differential pressure recording application.

In the embodiment of the invention shown in FIG. 1, fluid, 17, is shown flowing in a pipeline, 1, at a certain flow rate, Q. A simple plate orifice, 2, is placed in the pipeline, and as a consequence of the flow through this pipeline, the pressure at low pressure tap, 4, is less than the pressure at line press tap, 3. Thus, a differential pressure exists across the orifice plate, 2, and the rate of flow, Q, is known to be proportional to the square root of this pressure differential.

In FIG. 1, the device of the invention is being shown used as a combined indicator and recorder of the pressure differential created across the orifice. The line pressure at tap, 3, is connected to the high pressure port, 10, of the differential pressure measuring device of the present invention by means of piping or tubing represented by the dashed line, 18. Similarly, the low pressure at tap, 4, is connected to low pressure port, 11, by means of piping, 19. This will set up a pressure difference across the piston, 12, that is freely guided in cylinder, 9. The piston, 12, is connected firmly to one end of tension spring, 13, and the other end of this spring is connected to the end of cylinder, 9. Because the pressure is greater on the spring side of piston, 12, an unbalanced force will be created which will act to distend spring, 13, and the piston will move until a balance is reached wherein the differential force exerted across the piston will be equal and opposite to the force exerted by the distended spring upon the piston.

One distinguishing feature of this invention is that relatively large clearance is deliberately introduced between the piston, 12, and the cylinder, 13. This clearance is sufficient to ensure a small but definite flow of fluid, 16, (labelled $q$) through the clearance space. The clearance and flow rate are such that under all conditions an unbroken layer of fluid, 17a, exists between the outside of the piston, 12, and the inside wall of the cylinder, 9. Because of this layer of fluid, the travel of the piston will be virtually frictionless since only the motion of fluid molecules upon one another is involved, and there is no mechanical friction brought about by the rubbing of the piston and cylinder surfaces. As a consequence of the relatively large clearances used in the device of this invention, it is not necessary to use precision manufacturing processess in producing the piston and cylinder. On the contrary, simple machine tools can be used for this purpose.

It should be appreciated that in this major respect, the device of this invention is different from the majority of piston and cylinder combinations used in a wide variety of hydraulic applications. In conventional applications, the designers and manufacturers do their utmost to ensure very closely fitting parts by grinding, honing, and polishing operations. To prevent leakage past pistons, a wide variety of ingenious seals have been put into use. (Which seals, incidentally, introduce undesirable friction). In the present invention leakage, 16, is desired, and is therefore introduced.

Because of the small flow, $q$, small head (pressure) losses 16 will be felt across piping 18, 19, and in the pressure differential measuring device of the invention itself. However, the flow, q, is made such that it is never more than a fraction of one percent of the flow, Q, in the pipeline, 1. Through proper choice of the diameter of connecting piping 18, 19, and instrument sizing, likewise, the head losses in the external circuit will also be only a fraction of one percent of the differential pressure actually existing across ports, 3, and 4.

In order for there to be an indication and a recording by the instrument shown in FIG. 1, a small shaft, 14, is attached to piston, 12. This shaft passes through a low friction seal, 15, to a region outside the line pressure portion of the instrument. At the shaft's tip, a pen, 6, is attached. As differential pressure varies with time, the pen, 6, will make a trace, 7, on the moving paper, 5, thus making a time recording of differential pressure. To obtain an indication, a scale, 8, is also attached to the instrument, and this scale is marked directly in units of differential pressure. It should also be noted that by using a piston and cylinder of relatively large cross sectional area, a relatively large unbalanced force will be created even though a small differential pressure is applied. The effect of the small drag of the seal 15 upon this large force will be negligible. Thus, no inordinate expense need be incurred nor special care taken in the design and production of the seal, 15.

Alternatively, the piston need not have a shaft such as, 14, attached to it. If the piston is made of magnetic material it could be magnetically coupled to a mechanism outside the cylinder for indicating or recording by means of magnetic coupling. Many other techniques are known and are in use; for example, the position of the piston could be sensed by inductive, capacitance, or photoelectric means. However, all these devices are not the subject of this invention, but rather involve known techniques for exploiting the present invention which concerns differential pressure indicating and recording instruments.

Another embodiment of the invention is shown in FIG. 2. In this instrument, two concentric tubes or a double Pitot Tube is made up of an outer tube, 23, and an inner concentric tube, 24. The double Pitot tube is used as the pressure differential producing device. The Pitot Tube is inserted into the pipeline, 1, in which the velocity of the flowing fluid, 17, is to be determined. To prevent leakage of fluid, 17, out of the pipeline, a seal, 29, mounted in pipe fitting, 28, has been employed. Because of the velocity, V, of the fluid, 17, a relatively high pressure is built up at the small opening, 26, (marked $x$) in the outer tube, 23. Additionally, a relatively low pressure exists at small opening, 27, (marked $y$) of the concentric inner tube, 24. The velocity of the fluid, V, is proportional to the pressure difference existing at the two openings. These openings are opposed to one another with one, 26, facing upstream, and the other, 27, facing downstream. The higher pressure is transmitted from the outer tube, 23, through connecting tubing, 22, to the upper cap, 21, of the flowmeter. The lower pressure is transmitted from the inner tube, 24, directly through the lower cap, 25, of the flowmeter. Both caps, 21 and 25, secure tube, 30, which acts as a cylinder for piston, 12. In this embodiment of the invention, the tube, 30, is made of glass, and it has a scale, 20, etched upon its outer surface. Because of the difference in pressure acting on both sides of the piston, 12, an unbalanced force will be produced which acts to force the piston downwards to distend the extension spring, 13. For a given velocity of flowing fluid, 17, a point of equilibrium will be reached in which the upward pull of the spring is equal to the downward force acting on the piston. Thus, for each value of velocity, V, of the flowing fluid, a unique position of the piston, 12, will be obtained in the tube, 30. A reading of velocity is made by noting the scale reading by the bottom of the piston, 12.

Details of the device built according to the embodiment of the present invention shown in FIG. 2 are as follows: The glass tube, 30, has an inside diameter of 10.5 mm; piston, 12, has a diameter of 10.3 mm; the spring, 13, is wound of 0.3 mm diameter steel wire, with a spring diameter of 3.5 mm, and 30 turns in the spring; the outer tube, 23, is 3 mm in diameter, and the inner tube, 24, is 2 mm outside diameter; openings $x$ and $y$ (26, and 27) are 1 mm in diameter; and, the entire instrument is 200 mm in length and 15 mm maximal in outside diameter.

In the device described above, the flowmeter will detect the flow of water in a pipeline in the range of 0-3 meters per second. For the clearance used between piston, 12, and cylinder, 30, the maximal flow of water past the cylinder will be on the order of 6 centiliters per minute, or 0.36 liters per hour.

The path of this leakage flow is as follows: Fluid, 17, enters opening, 26, ($x$), flows up the outer tube, 23, through tube, 22, into the upper portion of glass tube, 30, around piston 12, down and through the lower portion of glass tube, 30, into inner tube, 24, and out through downstream opening, 27, ($y$) into the pipeline again. Because of the small rate of leakage, there is an extremely small frictional head loss through the various tubes involved, and the viscous or drag forces acting on the piston due to the flow through the clearance space between the piston and the glass cylinder are virtually nil in comparison with the large force due to the pressure differential produced by the Pitot Tube.

On the other hand, the leakage flow has a definite advantage in that it acts to center the piston, 12, in the glass tube 30. Additionally, an unbroken liquid film will be maintained between the outer wall of the piston, 12, and the wall of the glass cylinder, 30. Thus, throughout the range of motion of the piston, there is no mechanical contact between the piston and the cylinder wall.

The devices of the present invention are distinguished from other piston and cylinder hydraulic devices by the order of magnitude of the leakage. Unlike conventional hydraulic devices which attempt to reduce the clearance between piston and outer wall to a minimum, the present invention relies upon the fluid leakage to reduce the frictional forces between said piston and said outer wall.

A third embodiment of the invention is shown in FIG. 3 in which the differential pressure meter of the invention is combined with a line pressure measuring instrument. In this form the invention is particularly useful, for example, for agricultural workers. Generally, during irrigation, a field worker wishes to check line pressure, and in addition wishes to know or adjust the rate of flow of water flowing in the irrigation pipes.

In using the instrument for differential pressure or velocity measurements, the three-way valve is placed in the position shown in FIG. 3. In this position, in response to the velocity of fluid 17 flowing in the pipe line 1, the piston 12 will be deflected downwards against the action of the spring 13 and without any influence from compression spring 32. Inasmuch as the end of the spring 33 is not fastened to the top of the piston 12, but merely abuts against it, the spring only acts when the piston attempts to rise upward into tube 30a (during a line pressure measurement only). During velocity or differential pressure measurements, the presently described device acts identically as the device described in FIG. 2. To check line pressure, the instrument is inserted into pipeline, 1, through fitting, 28, and seal, 29, as explained in the embodiment shown in FIG. 2. To measure line pressure, the three-way valve, 31, is turned 90° clockwise from the position shown in FIG. 3. In the 90° rotated position of the valve, 31, line pressure is obtained as follows: The fluid, 17, exerts its pressure at point, $y$, which is transmitted through inner tube, 24, to the bottom portion of the glass tube, 30. This pressure acts upon the bottom of piston, 12, forcing it upwards into the glass tubes' upper portion 30a. The upward motion of piston, 12, is opposed by a relatively stiff compression spring, 32, and the top of the piston 33a bears against the free end, 33, of this spring. A point of equilibrium is reached where the force exerted against the top of the piston, 12, by the compression spring end, 33, is equal and opposite to the force exerted on the bottom of the piston by the fluid line pressure existing in the lower part of the glass tube, 30. This pressure can then be determined by reading the scale, 34, at the point corresponding to the top of the piston, 12. Note that the space above the piston in tube, 30a, is vented to the atmosphere through port, 36, the pathway in the body of the three-way valve, 31, and port, 35, of the three-way valve. Thus the instrument reads what is commonly known as "gauge pressure," or the pressure in the line relative to atmospheric pressure as the reference pressure. It should also be noted that when the three-way valve is rotated 90° clockwise for line pressure measurement, one of the tubes of the double Pitot Tube is not in use. That is, the pressure existing at point, $x$, is transmitted through the outer tube, 23, to connecting tube, 22, and is blocked at port, 37, of the three-way valve since, in the rotated position, the valve body solidly blocks this port 37. Further, the more delicate extension spring, 13, used when a velocity or differential pressure measurement is being made, is not involved during a line pressure measurement; it is then simply lifted and the coils compress as piston, 12, rises in tube, 30a, in response to the line pressure.

The overall dimensions of the device are only slightly greater than the device embodied in FIG. 2. As such it enables agricultural workers and others interested in obtaining line and differential pressure a means of obtaining a quick measurement.

While only a limited number of embodiments of the foregoing invention have been expressly described, it is nonetheless to be broadly construed and not to be limited except by the character of the claims appended hereto.

We claim:

1. A device for measuring differential fluid pressure comprising:

a closed hollow conduit, a first pressure port and a second pressure port wherein said first pressure port and said second pressure port are spaced apart on said conduit and wherein said first pressure port is in fluid communication with a first source of pressure by a first Pitot tube and said second pressure port is in fluid communication with a second source of pressure by a second pitot tube, the pressure of said first source being greater than the pressure at said second source;

a freely movable piston loosely fitted within the conduit between the pressure ports such that fluid is permitted to flow from said first pressure source past the loosely fitted piston and back to said second pressure source;

a spring member interposed between said one end of said conduit and one side of said piston for urging said piston towards said first pressure port;

and means for indicating the position of said piston.

2. A device as in claim 1 wherein said conduit is a cylindrical glass tube.

3. A device for measuring a fluid flow parameter in a fluid flowing in a pipe, said pipe having an opening in the exterior thereof to receive said device comprising a closed hollow conduit, a pressure port at each end of said conduit and a piston loosely fitted in said conduit between said pressure ports, a spring member interposed between said piston and one end of said conduit to control movement of said piston, a pair of Pitot tubes for establishing a pressure differential across the piston, each tube being connected to a different pressure port, each said Pitot tube having a pressure opening, one of said pressure openings adapted to face upstream of said flowing fluid and the other downstream of said flowing fluid to create and measure a pressure differential in said flowing fluid, said flowing fluid flowing into one pressure port and into said conduit under the influence of said pressure differential, only a small amount of said fluid being permitted to flow past said loosely fitting piston sufficient to lubricate the said piston and minimize friction errors.

4. A device as in claim 3 wherein the said piston is approximately 2 percent smaller than the interior of said conduit to permit fluid on the high pressure side of said piston to flow past the sides of said piston to the low pressure side.

5. A device for measuring differential fluid pressure in a flowing fluid and its line pressure comprising a hollow closed conduit having at least two pressure ports therein, a freely movable piston loosely fitted within said conduit between said two pressure ports, first and second spring members interposed between an end of the said conduit and the said piston, said first spring member being mounted on said piston, a double Pitot tube comprising two concentric tubes each having one end in said flowing fluid, one of said tubes having an opening facing upstream of said fluid flow and the other having an opening facing downstream of said fluid flow, each of said tubes being connected to a different one of said pressure ports, and a valve between one of said openings and the corresponding one of said pressure ports and having a solid valve face, a first valve port and an interconnected second valve port, said valve being adjustable between a first position on which one of said openings communicates with said first valve port and said second valve port communicates with one of said pressure ports, and a second position for measuring line pressure in which said one of said openings is sealed by the valve face and in which said first valve port communicates with said one pressure port and said second valve port communicates with the atmosphere.

6. A device as in claim 5 wherein said first spring member is a tension spring, and said second spring member is a compression spring.

7. A device for measuring a fluid flow parameter in a fluid flowing in a pipe comprising a closed hollow conduit, a pressure port at each end of said conduit and a piston loosely fitted in said conduit between said pressure ports, a spring member interposed between said piston and one end of said conduit to control movement of said piston in response to an applied pressure differential across said piston, means in said flowing fluid for creating a pressure differential therein, said means being connected to said pressure ports for establishing the said pressure differential across said piston, said means permitting some fluid from said pipe to flow into one of said pressure ports, past the loosely fitted piston and back into the pipe in response to the applied pressure differential, said piston being small enough to permit only enough fluid to flow past said piston as is necessary to lubricate the said piston to minimize friction errors, whereby movement of said piston is effected substantially by the established pressure differential.

* * * * *